United States Patent
Chandrasekaran

(10) Patent No.: US 10,122,529 B2
(45) Date of Patent: Nov. 6, 2018

(54) SYSTEM AND METHOD OF ENFORCING A COMPUTER POLICY

(75) Inventor: Guruparan Chandrasekaran, London (GB)

(73) Assignee: Scentrics Information Security Technologies Ltd., Limpsfield (GB)

( * ) Notice: Subject to any disclaimer, the term of this patent is extended or adjusted under 35 U.S.C. 154(b) by 0 days.

(21) Appl. No.: 13/521,674

(22) PCT Filed: Jan. 11, 2011

(86) PCT No.: PCT/GB2011/050033
§ 371 (c)(1),
(2), (4) Date: Oct. 12, 2012

(87) PCT Pub. No.: WO2011/083343
PCT Pub. Date: Jul. 14, 2011

(65) Prior Publication Data
US 2013/0159704 A1   Jun. 20, 2013

(30) Foreign Application Priority Data

Jan. 11, 2010   (GB) .................................. 1000288.9

(51) Int. Cl.
*H04L 29/06* (2006.01)
*H04L 9/08* (2006.01)
*G06F 21/57* (2013.01)

(52) U.S. Cl.
CPC ................ *H04L 9/08* (2013.01); *G06F 21/57* (2013.01); *H04L 9/083* (2013.01); *H04L 9/0844* (2013.01);
(Continued)

(58) Field of Classification Search
None
See application file for complete search history.

(56) References Cited

U.S. PATENT DOCUMENTS 5,148,481 A  *  9/1992  Abraham .............. G06F 12/121
                                                                     331/78
5,224,166 A       6/1993  Hartman, Jr.
(Continued)

FOREIGN PATENT DOCUMENTS

JP        2005197912        7/2005
JP        2005269396        9/2005

OTHER PUBLICATIONS

Stamm, S, Sheppard, NP & Safavi-Naini, R, Implementing Trusted Terminals with a TPM and SITDRM, First International Workshop on Run Time Enforcement for Mobile and Distributed Systems (REM 2007), Dresden, Germany, Sep. 27, 2007.*
(Continued)

*Primary Examiner* — Farid Homayounmehr
*Assistant Examiner* — Olanrewaju Bucknor
(74) *Attorney, Agent, or Firm* — O'Shea Getz P.C.

(57) ABSTRACT

A method and system of enforcing a computer policy uses a central server to manage user profiles, policies and encryption keys. The server securely supplies the keys to client devices only after checking that the policy has been complied with. The checks include both the identity of the user and the machine identity of the client device. The keys are held in a secure environment of the client device, for example in a Trusted Platform Module (TPM), and remain inaccessible at all times to the end user. Theft or loss of a portable client device does not result in any encrypted data being compromised since the keys needed to decrypt that data are not extractable from the secure environment.

18 Claims, 2 Drawing Sheets

(52) U.S. Cl.
CPC .......... *H04L 9/0891* (2013.01); *H04L 9/0897*
(2013.01); *H04L 63/08* (2013.01); *H04L*
*63/0823* (2013.01); *H04L 63/102* (2013.01);
*H04L 2209/127* (2013.01); *H04L 2209/80*
(2013.01)

(56) References Cited

U.S. PATENT DOCUMENTS

| | | | | |
|---|---|---|---|---|
| 5,719,938 | A | 2/1998 | Haas et al. | |
| 6,339,825 | B2* | 1/2002 | Pensak | 713/158 |
| 6,834,112 | B1* | 12/2004 | Brickell | 380/279 |
| 7,095,859 | B2* | 8/2006 | Challener | 380/282 |
| 7,437,752 | B2* | 10/2008 | Heard | H04L 63/101 |
| | | | | 380/247 |
| 7,458,102 | B2* | 11/2008 | Rogers | H04L 29/06 |
| | | | | 713/158 |
| 7,711,122 | B2* | 5/2010 | Allen et al. | 380/286 |
| 7,860,243 | B2* | 12/2010 | Zheng et al. | 380/30 |
| 7,908,483 | B2* | 3/2011 | Iliev et al. | 713/176 |
| 8,200,966 | B2* | 6/2012 | Grinberg et al. | 713/168 |
| 8,391,494 | B1* | 3/2013 | Serenyi | 380/278 |
| 8,731,203 | B2* | 5/2014 | D'Souza | 380/277 |
| 8,909,555 | B2* | 12/2014 | Proudler | G06F 21/50 |
| | | | | 705/64 |
| 2002/0071566 | A1* | 6/2002 | Kurn | H04L 63/062 |
| | | | | 380/281 |
| 2004/0039924 | A1* | 2/2004 | Baldwin | G06F 21/53 |
| | | | | 713/189 |
| 2004/0103202 | A1 | 5/2004 | Hildebrand et al. | |
| 2004/0117318 | A1* | 6/2004 | Grawrock | 705/66 |
| 2004/0141611 | A1* | 7/2004 | Szrek | G06F 7/58 |
| | | | | 380/28 |
| 2004/0268148 | A1 | 12/2004 | Hartman | |
| 2005/0060568 | A1* | 3/2005 | Beresnevichiene et al. | |
| | | | | 713/200 |
| 2005/0157880 | A1* | 7/2005 | Kurn | H04L 63/00 |
| | | | | 380/279 |
| 2005/0223216 | A1* | 10/2005 | Chan | H04L 63/083 |
| | | | | 713/153 |
| 2006/0095953 | A1* | 5/2006 | Frank | H04L 9/3231 |
| | | | | 726/1 |
| 2006/0117177 | A1* | 6/2006 | Buer | 713/155 |
| 2006/0149962 | A1* | 7/2006 | Fountain | H04L 63/0428 |
| | | | | 713/151 |
| 2007/0300069 | A1* | 12/2007 | Rozas | 713/176 |
| 2008/0189213 | A1* | 8/2008 | Blake | G06F 21/10 |
| | | | | 705/59 |
| 2009/0083539 | A1* | 3/2009 | Catherman | G06F 21/57 |
| | | | | 713/156 |
| 2009/0154709 | A1* | 6/2009 | Ellison | 380/282 |
| 2009/0205030 | A1* | 8/2009 | Ong | 726/6 |
| 2009/0307493 | A1* | 12/2009 | Smith | 713/170 |
| 2010/0082991 | A1* | 4/2010 | Baldwin et al. | 713/176 |
| 2010/0115584 | A1* | 5/2010 | Gotou | G06F 21/31 |
| | | | | 726/3 |
| 2010/0250955 | A1* | 9/2010 | Trevithick et al. | 713/185 |
| 2010/0303240 | A1* | 12/2010 | Beachem | G06F 21/57 |
| | | | | 380/277 |
| 2011/0093721 | A1* | 4/2011 | Perlman | G06F 21/602 |
| | | | | 713/189 |
| 2012/0066499 | A1* | 3/2012 | Ali et al. | 713/170 |

OTHER PUBLICATIONS

Stamm et al. "Implementing Trusted Terminals with a TPM and SITDRM", Electronic Notes in Theoretical Computer Science, vol. 197, No. 1, Feb. 20, 2008.
JP office action for JP 2012-547550 dated Oct. 7, 2014.
CN office action for CN 201180012382.4 dated May 26, 2014.
Peilin, "Design and Achievement of Security Protocol Based on a Trusted Platform Module", IT Collection of China Outstanding Master Degree's Paper Full-text Data-Base , pp. 1136-1193, Feb. 15, 2009.

* cited by examiner

SYSTEM AND METHOD OF ENFORCING A COMPUTER POLICY

This application is entitled to the benefit of, and incorporates by reference essential subject matter disclosed in PCT Application No. PCT/GB2011/050033 filed on Jan. 11, 2011, which claims priority to Great Britain Application No. 1000288.9 filed Jan. 11, 2010.

BACKGROUND OF THE INVENTION

1. Technical Field

The present invention relates to a system and method of enforcing a computer policy.

2. Background Information

Corporate Security Policies (SPs) are a vital part of corporate security governance. Such policies are put at serious risk when employees are allowed to roam with an organization's most vital asset—information. This is an extremely important problem that is also very difficult to satisfactorily address.

For example corporate policy might require any corporate laptop to protect any data stored on it even it is stolen, i.e. even if an adversary has physical access to the laptop and it is taken outside the corporate boundary (within which policy is typically enforced). Similarly, corporate laptops taken home in an authorized way by employees should still be governed by corporate policy, even though the laptop is outside the corporate premises.

Existing Security Policies are typically complex and time-consuming to manage due to the need to replicate encryption keys as employees move between offices and work on a variety of different computing devices both within and outside the corporate boundary. When an employee leaves employment, all of the corresponding encryption keys need to be revoked. These issues of key-management represent significant costs to companies attempting to enforce security policies on a mobile and ever-changing workforce.

It is an object of the present invention at least to alleviate these difficulties.

SUMMARY OF THE DISCLOSURE

According to a first aspect of the present invention there is provided a method of enforcing a computer policy comprising:

(a) defining a policy for controlling a user's access to sensitive data on a client device by means of a cryptographic key;

(b) storing the policy and the associated cryptographic key on a server;

(c) ascertaining the identity of the user, and cryptographically validating via a secure environment of the client device the identity and trustworthiness of the client device;

(d) when permitted by the policy, securely transmitting the cryptographic key from the server to the secure environment of the client device; and (e) providing the user with access to the sensitive data without disclosing to the user the cryptographic key.

According to a second aspect there is provided a system for enforcing a computer policy comprising:

(a) a server on which is stored a policy for controlling a user's access to sensitive data on a client device, and an associated cryptographic key;

(b) a client device operated by a user, the device including a secure environment holding the cryptographic key which allows the user access, when permitted by policy, to encrypted sensitive data on the client device without disclosing the key to the user;

(c) means for ascertaining the identity of the user and for cryptographically validating the identity and trustworthiness of the client device; and (d) means for securely transmitting the cryptographic key from the server to the secure environment of the client device when permitted by the policy.

From another aspect the invention provides a method of accessing a cryptographic key stored on a remote server in order to perform a cryptographic operation, comprising:

determining the identity of a user;

cryptographically validating the identity of the client device;

determining whether the identity of the user and the identity of the client device satisfy an access condition which is stored on the remote server;

securely transmitting the cryptographic key from the remote server to the client device when the access condition is satisfied; and using the cryptographic key to perform a cryptographic operation without disclosing the cryptographic key to the user.

Such a method may be used to control user access to data stored in encrypted form on the client device. The cryptographic operation may then comprise decrypting the data. The method may further comprise providing the user with access to the decrypted data without disclosing the cryptographic key to the user.

This aspect extends to a client device configured to:

allow the device's identity to be cryptographically validated;

receive a securely-transmitted cryptographic key from a remote server; and use the cryptographic key to perform a cryptographic operation without disclosing the cryptographic key to a user.

Data may be stored on the client device in encrypted form, with the device being configured to use the cryptographic key to decrypt the data and to provide a user with access to the decrypted data.

This aspect further extends to a server on which a cryptographic key and an access condition are stored, wherein the server is configured to:

determine whether the identity of a user and the identity of the client device satisfy the access condition; and transmit the cryptographic key securely to the client device when the access condition is satisfied.

The access condition may relate to the cryptographic key and/or to data stored in encrypted form on the client device.

In addition to and separate from the notion of user identity, a machine identity is used to enable complex and more expressive policies to be defined and enforced. This allows system administrators to specify what a particular user can do, and also what a user may do when using a particular machine.

Preferably the client device comprises a secure cryptoprocessor or hardware security module. In this way a secure environment can be provided (e.g. a Trusted Platform Module). Preferably the device is configured to use a secure cryptoprocessor to allow the device's identity to be cryptographically validated. Preferably the device is configured to use a secure cryptoprocessor to perform the cryptographic operation, such as using the cryptographic key to decrypt data stored on the device.

However a dedicated hardware secure environment is not essential and, in some embodiments, the client device may use software executing on a microcontroller or central processing unit (CPU) to create a secure environment. Such means may be used to perform the cryptographic operation and/or to allow the device's identity to be cryptographically verified.

The client device is preferably configured to hold the cryptographic key in volatile memory (e.g. RAM) and to clear the cryptographic key from the memory after performing the cryptographic operation.

Preferably the server is configured to validate the identity of the client device.

The identity of the user may be verified by the client device and/or the remote server.

The client device may be configured to validate the identity of the server.

All cryptographic keys used to protect sensitive data on the client devices are preferably stored on a central server and are preferably never stored on the local disks of client machines. This reduces the impact of theft of a portable client device—any encrypted data stored on such a device cannot be recovered, since the necessary decryption keys will not be available.

Data to be decrypted may be any type; for example, they may comprise all or part of an email message.

The cryptographic key might be used to by the client device for any of a variety of purposes; e.g. to decrypt data, to encrypt data, to sign data, or to establish a secure session with a remote device.

The access condition may constitute a security policy.

In contrast with existing methods of enforcing a computer policy, in the preferred embodiment:

cryptographic keys (used to protect data) are preferably not stored long-term on client devices;

the system can control whether client keys are made available to client devices (thus enforcing policy) because of its ability to identify remotely both devices and users, and to verify the integrity of remote devices.

This allows server-centric policy enforcement even on remote devices. This policy enforcement can take place across any distributed environment such as the Cloud.

The cryptographic key may be specific to the user.

The remote server may transmit one or more certificates along with the cryptographic key. It may transmit a plurality of cryptographic keys to the client device.

In some embodiments, Trusted Computing is used for the enforcement of policy covering the download of user profile containing user-specific secret keys.

This differs from other applications (e.g. the trusted software download application) in the following ways:

a user profile is something specific to a user, not a general purpose piece of software;

policy-based control of access to specific parts of the user profile enables policy-based control of access to secret and private keys in a flexible manner—for example, the policy may permit the release of low grade keys to platforms in a broad class, but only permit the download of high grade keys to very specific platforms in a very specific set of possible software states;

policy-based control of a user profile enables many other possible applications, since it gives flexible access to cryptographic keys (which can themselves be used to control access to further services and/or information).

Any optional feature of one aspect may be an optional feature of any other aspect, wherever appropriate.

DETAILED DESCRIPTION OF THE INVENTION

Certain preferred embodiments of the invention will now be described by way of example only.

Components

Figure 1:
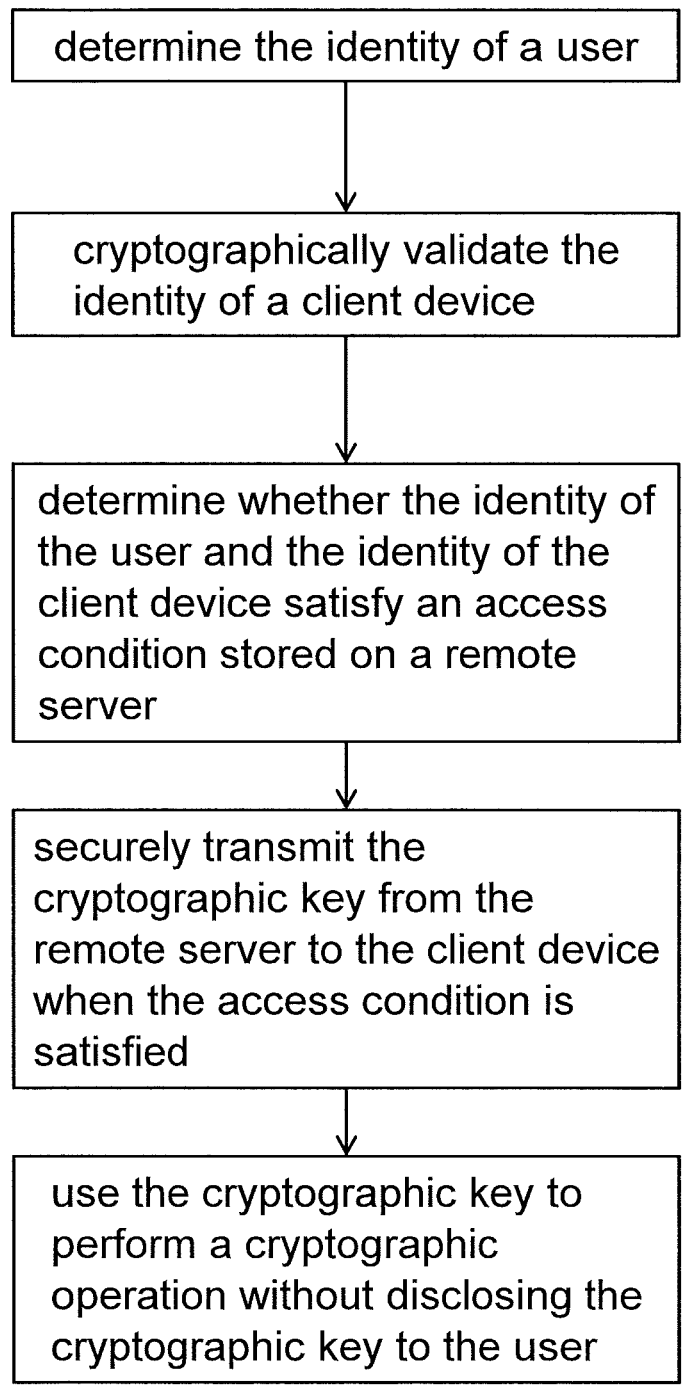
FIG. 1 is a flow chart illustrating an embodiment of the invention.
Figure 2:
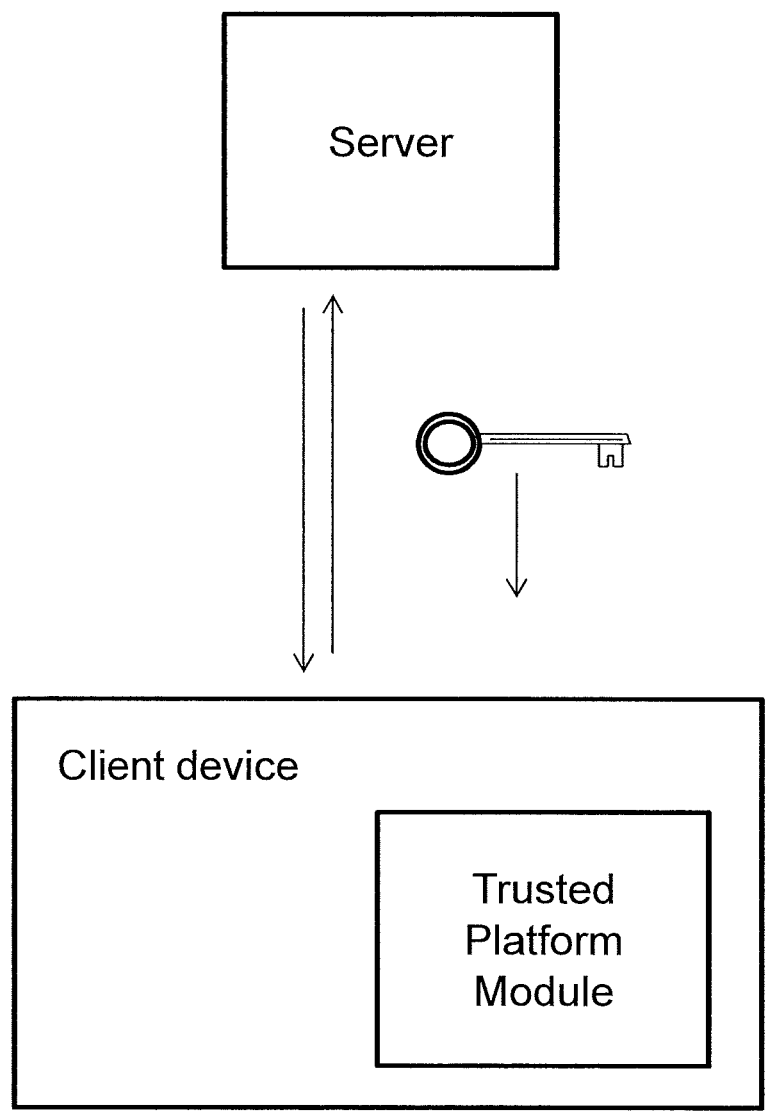
FIG. 2 is a schematic diagram of a system embodiment of the invention.

A preferred embodiment (e.g., see FIG. 2) incorporates the following devices:

1. a server computing device, preferably offering web services;

2. a user-agent client device which is equipped with a Trusted Platform Module (TPM) conforming to the Trusted Computing Group specifications (or any other device or system offering similar security services).

Each user-agent's TPM is equipped with a public/private cryptographic key pair, providing the foundation for a unique user-agent (machine) identity. Because of the way it is designed, and given its tamper-resistant properties, the TPM private key is never made available outside the TPM, making identity theft of the client device extremely difficult.

Client-Server Protocol

In order for the server to verify the user-agent's identity, and thus use it in policy enforcement, the following protocol is applied:

1. The user-agent/client device verifies the server. This is done by verifying a signature produced by the server and checking the server's public key (programmed in the user-agent).

2. The server verifies the user-agent by interrogating the TPM. The server challenges the TPM, requesting the TPM to compute a signature using a private key belonging to the TPM. Note that the TPM's private key never leaves the TPM in unencrypted form, and thus cannot be stolen (e.g. via malicious software running on the client platform).

Once the identity of the user-agent's physical device has been authenticated, user verification is performed via an appropriate user authentication mechanism, e.g. involving passwords, cryptographic key pairs, and/or biometrics. The system allows the identification of arbitrary combinations of devices and users, i.e. a single user can employ multiple devices, and a single device can be employed by multiple users. Policy can then be enforced accordingly.

Remotely Verifying the User-Agent

Policy can limit system functionality, for example by disabling uncontrolled internet connectivity when connected to a corporate VPN in order to avoid data leakage via the (insecure) internet. The user-agent can be programmed to enforce such policies.

However, through the use of the combination of server control of keys and the TPM on the client platform, the solution we describe can also provide assurance to the server that the policy is actually being enforced. Suppose that a malicious, modified, user-agent reports to the server that it is enforcing policy, when in reality it will not. The server can verify the integrity of the remote system via its TPM, and hence detect the presence of a modified user-agent, using the following procedure.

1. At boot time, the TPM verifies the integrity of the operating system, and securely records measurements characterizing the software that has been loaded.

2. The operating system, whose integrity is guaranteed by the TPM measurements made at boot time, verifies the integrity of the user-agent. The results of this measurement are also stored internally to the TPM.

3. When the server authenticates the identity of the remote device, it also confirms its integrity. That is, the authentication process involves the transfer from the TPM to the server of the integrity measurements referred to in steps 1 and 2; this transfer takes place in such a way that the server can verify that the measurements indeed come from a genuine TPM embedded in the platform with which it is communicating. This is achieved by the TPM digitally signing the integrity measurements using a private key verifiably unique to that TPM. This process is known as attestation.

4. The server processes the integrity measurements for the client platform, and decides whether or not these are indicative of a processing environment consistent with the security policy in force.

5. If the policy requirements are met, then the server transfers the cryptographic keys to the device in such a way that the client platform will only be able to decrypt them if the integrity measurements sent in message 3 are still valid. This uses functionality known as sealed storage (as described for example in the paper *The Trusted Platform Module (TPM) and Sealed Storage*, Bryan Parno, 21 Jun. 2007, available at www.rsa.com/rsalabs/technotes/tpm/sealedstorage.pdf). This effectively binds the security policy to the set of keys downloaded to the client platform, i.e. so that the keys are only available to client platforms meeting the policy requirements.

This procedure shows the importance of the notion of machine identity for ensuring that policy is being enforced in a remote setting. The combination of server-centric key management and the use of TPM-based integrity measurements (including attestation and sealed storage) is believed to be unique to the present embodiment.

Key-Based Policy Enforcement

Policy can and usually does limit access to sensitive data held on the client device. Encrypted data can be disclosed freely, assuming that the keys necessary for decryption are kept secret. Thus, the problem of limiting access to data can be transformed to a key management problem; by denying a user access to keys, the user cannot access (encrypted) data.

Performing policy control in this way provides significant advantages, especially with remote devices. If a remote device held data in cleartext and was stolen, data could be read by analyzing the contents of the hard disk directly, regardless of any operating system enforced access restrictions or the presence of a TPM. This is impossible if the data is encrypted and the necessary decryption keys are not stored on the client device.

To enforce policies regarding the handling of sensitive data, the following mechanism is used:

1. Data is encrypted with a key generated and kept on the server.

2. If a user is allowed access to data by the policy in force, the server discloses the necessary decryption key(s) to the user-agent, only after the user-agent's host machine and the user have been authenticated. The end user never learns the key from the user-agent as the key is never stored (in cleartext) on the client machine's hard disk, and is stored only in protected memory, inaccessible from (say) debuggers. These properties are enforced because the system's integrity has been verified by the server, for example, using a TPM attestation procedure. Because the end user never learns the decryption keys, it is possible to revoke such keys and hence revoke access to data, by simply eliminating keys from the user-agent's memory.

3. To allow offline data access, the user-agent may (subject to policy) store the data encryption key on disk in encrypted form. The key used to encrypt the data key is protected using the TPM's sealed storage function, thus making recovery in unauthorized ways impractical because of the tamper-resistant properties of the TPM. Only when the client system is running the appropriate set of software (including the valid user-agent) will the TPM permit the key encrypting key to be decrypted—using the sealed storage functionality.

The novel combination of server-centricity to manage policies (and keys), and the use of a secure environment such as TPM to verify policy enforcement and allow off-line data use, enables robust server-based corporate policy management and enforcement on remote devices.

Profile Transfer

We now turn to a detailed explanation of the transfer of user profiles from a server to a client device.

Introduction

The word 'profile' is used here to mean a set of user-specific data stored on a central server. This profile includes such things as cryptographic keys and policy information relating to that individual, e.g. which applications he/she is authorised to use, and in what circumstances the keys should be downloaded to a client. The term profile is used loosely—it may well be appropriate to only download parts of the profile information to a client machine, with the choice of elements depending on the type of client being used, and/or the specific user requirements at the time of download.

We divide the description of the profile transfer protocol into three phases: a preliminary (set-up) phase, and two main phases. Whilst the set-up phase will only be performed once for each relevant entity, the other two phases will be performed every time a user wishes to make use of a client machine, i.e. for every session. The main phases (Phases I and II) are described separately here to simplify the explanation; however, in practice, the implementations could overlap—for example, messages implementing Phase I could be sent at the same time as some of the messages implementing Phase II.

Every user and every server must perform the set-up phase prior to engaging in the protocol. This phase will establish all the necessary long-term keys and user profiles. Once performed, it will not normally be necessary to perform the set-up phase again, unless a security compromise has occurred or the user status has changed.

Phase I is intended to enable the client platform and the server to share a secret session key, which can then be used both to protect the transfer of the user profile in Phase II.

In Phase II, the client (securely) requests the profile from the server—the request can be authenticated using the session key established in Phase I. The request could, for example, indicate which types of key are required. The server then selects the relevant parts of the profile to send to the user, generates any necessary short-term key pairs and/or secret keys, generates any necessary short-term public key certificates, and assembles the material to be sent to the user. This package of profile data is then encrypted and integrity-protected using the session key established in Phase I, and the package is sent to the client. On receipt of the profile data from the server, the client verifies and decrypts it, and processes the information ready for use.

Set-Up Phase

The objectives of this preliminary phase are to equip the parties involved in the scheme with the resources they need to participate in the protocol. We divide this discussion into three parts, covering the set-up requirements for the server, user and client.

Server Set-Up

To establish a server to support the scheme, the following steps take place:

1. The necessary software is installed.
2. Provision is made to enable the secure storage of user profiles and user passwords.

User Set-Up

In order for a user to start using the scheme, the following steps are performed:

1. The user establishes a relationship with a server. This could, for example, be a fee-paying contractual relationship (where the server is providing a service to the user), or a relationship which arises 'by default' with the user's employment where the server is run by, or on behalf of, the employer.
2. The user selects one or more Certificate Authorities (CAs) who will be responsible for generating certificates for user public keys. Of course, depending on the server-user relationship, this may be done automatically for the user by the server.
3. The user establishes a shared secret password with the server.
4. The server creates a profile for the user. The user specifies (or has automatically selected) which types of keys are required. The server will then generate the necessary secret keys and asymmetric key pairs, and obtain certificates for the public keys from one or more CAs. (Note that the only long-term key needed as part of the user profile may be a signature key pair.)
5. The server will then securely store the profile (containing, for example, secret keys, asymmetric key pairs and accompanying public key certificates) along with the user password or other user identification details. Note that each key has certain information associated with it, including an identifier for the algorithm with which it is to be used, the intended use (e.g. encryption, MAC generation, signature generation, etc.), and a validity period.

Client Set-Up

In order for a client device to be employed by a user as part of the scheme, the following steps are performed:

1. Appropriate software is installed on the client (however, this could be performed dynamically by downloading it from the server, e.g. as a Java applet, at the time of use).
2. The client machine's TPM is initialized, and the server made capable of dealing with a platform containing the type of TPM or other security environment in use on the client machine.

Phase I

The main objective of this phase is to establish a short-lived secret session key between the client machine and the server. We now discuss possible ways of realizing this phase of the protocol.

Note that, in order to ensure that the profile is only made available to a platform running trustworthy software, trusted computing functionality can be used to verify the software environment on the recipient (client) platform. This should be done in such a way that only a trustworthy platform will have access to the short-lived session key. Without this key, the profile sent from the server to the client cannot be decrypted, and hence will not be available to the client. that is, policy control is exerted through access to the short-lived session key.

Possible means of establishing the short-lived key are discussed below. Ways in which this process can be made dependent on trusted computing are discussed later.

A Trivial Approach

A very simple approach is for both parties to simply derive a key from the shared secret password. In order to ensure that a different key is used for each session, one of the two parties could first generate a random number r, e.g. of 128 bits, and send it to the other party. Both server and client could then generate the session key as $K=h(p\|r)$, where h is a cryptographic hash-function (e.g. SHA-256; ISO/IEC 10118-3:2003, *Information technology—Security techniques—Hash-functions: Part 3: Dedicated hash-functions*. International Organization for Standardization, Geneva, 2003.), p is the user's secret password, and $\|$ denotes concatenation of strings of bits.

Whilst very simple, such an approach has a major weakness. If an attacker intercepts r and also intercepts some data encrypted using the session key K, then the following offline dictionary attack is possible if p is drawn from too small a set of possibilities:

The attacker works through the set of all possible passwords one at a time, eliminating incorrect 'guesses' in the following simple way. Suppose p* is a candidate value for the password. The attacker computes the corresponding candidate session key $K^*=h(p^*\|r)$, using the intercepted value of r. The attacker then tries decrypting the intercepted ciphertext using K*, if the result does not yield meaningful plaintext then the candidate password can be eliminated.

In fact, it is somewhat difficult to readily memorize passwords which are taken from a sufficiently large set to prevent such attacks. Even if we suppose that users choose 8-character passwords, with each character being either a letter or a numeral, then the number of possible passwords is only $36^8 \approx 2.8 \times 10^{12}$. Working through a set of this size is not infeasible (although non-trivial).

It is thus desirable to use a more robust approach, e.g. along the lines proposed below.

An SSL-Based Approach

Another relatively simple approach is to require the server to first set up a Secure Sockets Layer (SSL) session with the client machine. The client machine needs to have a means to verify that the session has been set up with the appropriate server. This could, for example, involve the software downloaded to the client being pre-equipped with a trusted copy of the public key of the server.

Once the SSL session is in place, the client software could then prompt the user to enter his/her password, which can then be sent to the server (via the SSL channel) for verification. Since the password is communicated over an encrypted channel (as provided by SSL), it is protected against compromise by an interceptor.

The SSL channel could also be employed in Phase II to provide a secure means of transfer for the profile.

There is one major disadvantage of such an approach. The client must have the means to verify that it is talking to the correct server, or otherwise man-in-the-middle attacks can be launched. If the software that is used by the client contains the public key of the server, then this problem is avoided—however, it does mean that the software to be used on a client machine must be personalized to include the public key of the particular server with which the user has a trust relationship.

There may be scenarios where this may be difficult to arrange. The above problem is avoided by the solution described immediately below.

A Standards-Based Approach

There are a number of well-established protocols which are designed to enable a secret session key to be established using a user-memorable password in such a way that offline dictionary attacks are not possible. Moreover, such protocols can also be designed to foil more active attacks (as long as some measure is in place to count unsuccessful authentication attempts and take appropriate countermeasures).

Three such protocols are specified in clause 6 of ISO/IEC 11770-4:2006, *Information technology—Security techniques—Key management: Part 4: Mechanisms based on weak secrets*. International Organization for Standardization, Geneva, 2006, there Key Agreement Mechanisms 1, 2 and 3. All these mechanisms are believed to be secure, and any of them would be appropriate for use in the scheme. Next we consider their relative advantages and disadvantages.

Security Properties

All three of the mechanisms in ISO/IEC 11770-4 have very similar security characteristics. The only significant difference (with current knowledge) is that mechanism 1 requires the server to know the password, whereas the other two mechanisms only require the server to store the hash of a password. This latter property may have some (small) practical advantages.

Implementation Issues

There are some differences in properties between the options, as follows:
  mechanism 1 (SPEKE) can be implemented using three message flows; mechanisms 2 (SRP6) and 3 (AMP) require at least four message flows;
  mechanisms 1 and 3 can be implemented both in the 'standard' discrete log setting and the elliptic curve setting;
  mechanism 2 can only be implemented in the 'standard' discrete log setting;
  all three mechanisms are believed to have similar computation costs, although the differences have not been checked in detail.

An Implementation Using SPEKE

To clarify the above discussion, we give a simplified description of Phase I in the case where Mechanism 1 from ISO/IEC 11770-4 is used.

1. Provide user name and password. The user will need to run the client software and equip it with the user's name and password. It may be appropriate for the user to provide additional information at this stage, such as the types of keys the user would like to have downloaded from the server (such information would be used in phase II).

2. Request profile (phase I). The client software will then send a message to the server to request the initiation of the profile download process.

3. Establish session key (phase I). The server and client now use the SPEKE protocol, as specified in clause 6.1 of ISO/IEC 11770-4 [6], to establish a shared secret key.

We now explain in a little more detail how steps 2 and 3 could be implemented. References are made to the descriptions in clause 6.1 of ISO/IEC 11770-4 [6]. We suppose that the client corresponds to A in 11770-4 and the server corresponds to B.

1. The client software performs the key token construction step (A1) specified in clause 6.1.3 using the user-provided password $\pi$.

2. The client software sends $w_A$ to B, along the user name and a request to inaugurate profile download.

3. On receipt of the message from the client, the server recovers the user password $\pi$ from the user profile (indexed by the user name) and performs the key token construction step (B1) specified in clause 6.1.3 using $\pi$.

4. The server send $w_B$ to A.

5. The server uses the received value of $w_A$ in step B2 to obtain the shared secret key $K_i$.

6. On receipt of the message from the server, the client uses the received value of $w_B$ in step A2 to also obtain the shared secret key $K_i$.

Note that the key confirmation steps are omitted, as phase II provides a degree of (one way) key confirmation. Note also that it may be helpful for the client (A) to generate a random session identifier and sent it to the server (B) in step 2 above. The server should then send this back to the client in step 4, enabling the client to match responses to requests.

Phase II

The main objective of this phase is to securely download user profile data from the server to the client machine.

There are a variety of ways in which this could be implemented. We give one option.

The transfer protocol takes the following general form.

1. Client→Server: Request for Profile

This request message specifies which types of key are needed by the client machine. For example, if the user only needs to perform signature operations, then the profile information to be provided to the user only needs to include a signature private key (and certificate for the corresponding public key).

Note that this message could be sent at the same time as one of the messages in Phase I. However, it may be necessary to integrity protect and, possibly, to encrypt this message. If so, then it can only be sent after the client machine has obtained a copy of the session key.

2. Server: Prepare Profile

Once the request has been received (and verified) by the server, it performs the tasks necessary to prepare the data to be sent to the client machine All the necessary keys and certificates are then put into a formatted profile, ready to be downloaded to the client.

3. Server→Client: Encrypted Profile

Once the profile data has been assembled by the server, including keys and certificates, it can be sent to the client. Prior to transmission it should be encrypted by the server using the session key. The method of encryption should provide both confidentiality and integrity protection, and one of the techniques contained in ISO/IEC 19772:2009, *Information technology—Security techniques—Authenticated encryption*. International Organization for Standardization, Geneva, 2009, is highly recommended.

Note that this message could be sent at the same time as one of the messages in Phase I, as long as the necessary session key is available to the server.

4. Client: Process Received Profile

Finally, on receipt of the encrypted profile, the client can verify and decrypt it using the secret session key.

As discussed above, a profile will normally be generated for every user. A user profile will contain a range of keys and certificates. Some or all of these keys and certificates can then be sent to the client machine whenever a session is established.

This approach has the advantage that the server will not need to generate any new keys or certificates when a client requests a profile, since all the necessary keys are generated in advance. Also, each public key will have a single certificate associated with it, signed by a trusted CA.

However, this approach has the disadvantage that, if a client machine is ever compromised, then the long-term private keys of the user are also compromised. Moreover, whilst key revocation is possible, this will only occur if the compromise is detected, and this will not always be the case.

Finally note that there may be a need to 'unpack' the profile to provide keys and/or certificates to other applications on the client host. If the private keys are then outside the direct control of the system of the invention, it may be difficult to ensure that these keys are deleted at the end of a session.
Use of Trusted Computing The fact that the client device may not be trustworthy brings with it significant security risks. If the server can verify that the correct software is running on a client (and that the client operating system environment is secure) prior to downloading the profile to the client, then profile security can be significantly improved.

Such a capability is offered by trusted computing (see, for example, C. Mitchell (ed.), *Trusted Computing*. IEE Press, London 2005). This technology is now present in a significant proportion of new PCs, in the form a special purpose security chip known as a Trusted Platform Module (TPM). The technology allows one device to remotely verify the nature of the software running on another platform, and to restrict access to secrets to specific software configurations. These properties would appear to be ideally suited to the operational model described above.

We now consider the trusted computing functions which can be used to make the profile transfer process policy controlled. As discussed above, this involves making access to the short-lived session key conditional on the server being content with the state of the remote client platform.
Related Work The general notion of only allowing certain things to occur if a remote platform is in a certain state (as tested using trusted computing functionality) is a well-established one. The Trusted Network Connect (TNC) protocol uses trusted computing to decide whether or not to admit a client PC to a network. A server requires the client to provide evidence of its software configuration before deciding whether or not to admit the client to the network. TNC has been standardized by the trusted computing group http://www.trustedcomputinggroup.org/)—for a simple description of its operation see, for example, S. Rehbock and R. Hunt, 'Trustworthy clients: Extending TNC to web-based environments'. *Computer Communications* 32 (2009) 1006-1013.

This general idea has also been proposed as a means of protecting sensitive software by only downloading this software to a platform verifiably in a trusted state. This idea has been described by E. Gallery and A. Tomlinson, 'Secure delivery of conditional access applications to mobile receivers', in: C. J. Mitchell (ed.), *Trusted Computing*, IEE Press, 2005, pp. 195-237; E. Gallery and A. Tomlinson, 'Protection of Downloadable Software on SDR Devices', in: *Software Defined Radio Technical Conference SDR* 05, November 2005; E. Gallery, A. Tomlinson and R. Delicata, 'Application of Trusted Computing to Secure Video Broadcasts to Mobile Receivers', Technical Report RHUL-MA-2005-11, Department of Mathematics, Royal Holloway, University of London, June 2005; E. M. Gallery and C. J. Mitchell, 'Trusted computing technologies and their use in the provision of high assurance SDR platforms', in: Proc. of 2006 Software Defined Radio Technical Conference, Orlando, Fla., November 2006.
A Simple Approach The simplest approach is for the server to require the trusted platform to attest to its current software configuration immediately prior to starting the process of agreeing a secret key. This assumes that the client platform has a TPM, and the software on the client is capable of using the TPM to store measurements indicative of the current state of the client platform in the PCRs (Platform Configuration Registers) within the TPM. The attestation process then operates along the following lines.

1. The server sends a random challenge to the client, together with the serial numbers of the PCRs whose values it wishes to have assurance of.

2. The client passes this information to its TPM, which digitally signs a string containing the random challenge and the current values of the requested PCRs (together with their indexes).

3. This signature is then passed back to the server which can verify the signature (and check the random challenge for freshness) and thereby verify that these PCR values are an accurate record of the current software state of the client platform.

The signature is computed using an attestation identity key, a signature key the private value of which is available only to the TPM. The validity of the associated public key (used to verify the signature) can be verified by the server checking a public key certificate also supplied by the client.

The server can then verify that the PCR values match a software configuration deemed acceptable by the policy statement associated with the relevant user profile. If (and only if) the policy deems this configuration acceptable, the server then proceeds to establish a shared secret key, as described above.
A More Robust Approach One problem with the approach described immediately above is the possibility that the software state of the client might change between the time that the measurement takes place and the time (shortly afterwards) when the shared secret is established. This problem can be removed by combining the process of attestation with the establishment of the shared secret key. Methods to achieve this have been described in the literature—see, for example, Gallery, Tomlinson, Delicata and Mitchell.

Although this invention has been shown and described with respect to the detailed embodiments thereof, it will be understood by those skilled in the art that various changes in form and detail thereof may be made without departing from the spirit and the scope of the invention.

What is claimed is:

1. A server, comprising,
a store in which are stored (i) a first user-specific asymmetric cryptographic signature private key, for generating a digital signature, (ii) a user-password, or a value derived from a user-password, and (iii) an access condition, the server comprising a processing device and being configured to:
generate user-specific asymmetric cryptographic signature key pairs, containing user-specific asymmetric cryptographic signature private keys;
store the user-specific asymmetric cryptographic signature private keys in said store;
authenticate an identity of a client device;
determine whether a password received by the client device from a user is the same as said user-password;
determine whether an identity of the user of the client device satisfies the access condition; and
transmit the stored first user-specific asymmetric cryptographic signature private key securely to the client device when the access condition is satisfied.

2. The server of claim 1, further configured to verify the identity of the user.

3. The server of claim 1, further configured to transmit one or more certificates along with the stored first user-specific asymmetric cryptographic signature private key.

4. The server of claim 1, wherein the store further stores a policy for controlling access to sensitive data on the client device, and stores a cryptographic key associated with the policy.

5. The server of claim 1, wherein the server is a web server.

6. The server of claim 1, configured to authenticate the identity of the client device by requesting a hardware security module on the client device to compute a signature using a private key belonging to the hardware security module.

7. The server of claim 1, configured to verify the integrity of the client device.

8. The server of claim 1, configured to receive, from the client device, the password received by the client device from the user.

9. The server of claim 1, further configured to receive a communication from the client device for determining the validity of the user-password.

10. A method of generating a digital signature on a client device, comprising:
- a remote server generating a user-specific asymmetric cryptographic signature key pair, containing a user-specific asymmetric cryptographic signature private key and storing the user-specific asymmetric cryptographic signature private key on the remote server;
- a user-password, or a value derived from a user-password, being stored by the remote server;
- determining an identity of a user of the client device;
- cryptographically validating an identity of the client device;
- receiving, on the client device, a password from the user, being the same as said user-password;
- the remote server and/or the client device determining that the password received from the user is the same as said user-password;
- the remote server determining that the identity of the user satisfies an access condition which is stored on the remote server;
- securely transmitting the user-specific asymmetric cryptographic signature private key from the remote server to the client device in response to said determining that the access condition is satisfied; and
- the client device generating a digital signature by signing data with the user-specific asymmetric cryptographic signature private key, without disclosing the user-specific asymmetric cryptographic signature private key to the user of the client device.

11. The method of claim 10, wherein the client device comprises a hardware security module and is arranged to use the hardware security module to allow the server to cryptographically validate the identity of the client device.

12. The method of claim 11, wherein the hardware security module is a Trusted Platform Module.

13. The method of claim 11, wherein the client device is arranged to use the hardware security module to sign the data.

14. The method of claim 10, further comprising the client device holding the user-specific asymmetric cryptographic signature private key in volatile memory and clearing the user-specific asymmetric cryptographic signature private key from the volatile memory after signing the data.

15. The method of claim 10, further comprising the remote server validating the identity of the client device.

16. The method of claim 10, further comprising the remote server verifying the identity of the user.

17. The method of claim 10, wherein the remote server has an identity, the method further comprising the client device validating the identity of the remote server.

18. The method of claim 10, further comprising the remote server transmitting one or more certificates along with the user-specific asymmetric cryptographic signature private key.

\* \* \* \* \*